United States Patent [19]
Nakagawa et al.

[11] Patent Number: 5,328,703
[45] Date of Patent: Jul. 12, 1994

[54] METHOD FOR TREATING FRUIT JUICE WITH HIGH PRESSURE

[75] Inventors: Yoshihiro Nakagawa, Saitama; Shinya Ochiai, Ibaraki; Masayuki Taniguchi, Tokyo, all of Japan

[73] Assignee: Toppan Printing Co., Ltd., Tokyo, Japan

[21] Appl. No.: 49,666

[22] Filed: Apr. 21, 1993

Related U.S. Application Data

[63] Continuation of Ser. No. 766,096, Sep. 27, 1991, abandoned.

[30] Foreign Application Priority Data

Oct. 12, 1990 [JP] Japan ............................. 2-274723

[51] Int. Cl.$^5$ .............................................. A23L 2/02
[52] U.S. Cl. ............................... 426/52; 426/51; 426/599
[58] Field of Search ..................... 426/50-52, 426/49, 590, 599, 615, 616

[56] References Cited
U.S. PATENT DOCUMENTS

1,338,684  5/1920  Dunlap ................................. 426/51
2,680,688  6/1954  Moulton ............................... 426/51
3,083,104  3/1963  Celmer ................................. 426/50
3,258,407  6/1966  Blanchon ............................. 426/50

OTHER PUBLICATIONS

Ochiai, S. et al. 1991, Sterilization by high-pressure treatment, Journal of Antibacterial and Antifungal Agents, 19(6), 269-273, abstract.

Watanabe, M. et al., High-pressure sterilization of ice nucleation-active bacterial cells, Agricultural and Biological Chemistry, (1991) 55(1), 291-292, abstract.

Ogawa et al., Effect of Hydrostatic Pressure on Sterilization and Preservation of Freshly-Squeezed Non-Pasteurized Citrus Juice, Nippon Nogeikagaku Kaishi, vol. 63, No. 6, pp. 1109-1114, 1989.

Primary Examiner—Donald E. Czaja
Assistant Examiner—Leslie Wong
Attorney, Agent, or Firm—Staas & Halsey

[57] ABSTRACT

A method for treating fruit juice with high pressure having a step for compressing the fruit juice with high pressure in excess of 2,000 atm., wherein a step for adding a proteolytic enzyme particularly a proteolytic enzyme active in an acid precedes the high pressure sterilization process.

4 Claims, 1 Drawing Sheet

METHOD FOR TREATING FRUIT JUICE WITH HIGH PRESSURE

This application is a continuation of application Ser. No. 07/766,096, filed Sep. 27, 1991, now abandoned.

FIELD OF THE INVENTION

This invention relates to a method for treating fruit juice containing pectin and pectin decomposing enzymes with high pressure, the method being effective to remove drawbacks wherein natural fruit juice is dissolved into precipitation and limpid juice.

BACKGROUND OF THE INVENTION

The juice of various fruits e.g. citrus fruits, apples, peaches and the like is used for a beverage or for a sarcocarp beverage, and the juice of citrus fruits e.g. citrus junos, citrus sphaerocarpa, citrus limon and the like is used for seasoning. The juice of these fruits is generally used for the fresh juice in the form of a suspension containing fine fibrous elements of the fruits or under the as-extracted condition, though it is sometimes used for limpid juice after the fine fibrous elements of the fruits are removed therefrom.

Since the as-extracted natural fruit juice contains not only the aforementioned fine fibrous elements of the fruits but also pectin and pectin decomposing enzymes, the fine fibrous elements of the fruits are combined with one another due to the function of pectin and form a colloidal suspension. On the other hand, since the as-extracted natural fruit juice contains pectin decomposing enzymes, e.g. pectin esterase, poly galacturonase et al., pectin is gradually decomposed and therefore becomes inactive. Following the progress of this reaction, the colloidal suspension is dissolved into precipitation of the fine fibrous elements of fruits and limpid juice. Incidentally, putrefaction occurs due to the function of microorganisms e.g. molds, yeasts or the like. Therefore, the natural fruit juice can not be stored for a long time.

For the purpose of enabling the natural fruit juice to be stored for a long time, a sterilization process which is conducted at approximately 90 degrees C has been used. In other words, the heating sterilization process has been conducted for two purposes, including extinction of the microorganisms which cause putrefaction and deactivation of the pectin decomposing enzymes which are effective to keep the natural juice in a colloidal situation which is produced by combining fine fibrous elements of the fruits with one another, employing the function of pectin, thereby preventing the colloidal juice from being dissolved into precipitation and limpid juice. This heating sterilization process, however, requires a long time for transmitting heat and is involved with drawbacks wherein the nutritious elements are destroyed, the aromatic elements are dispersed, and the color and the taste are deteriorated due to heating with high temperature, thereby in combination deteriorating the quality of the natural juice.

For the purpose of removing the drawbacks of the heating sterilization process which inevitably deteriorates the quality of the natural juice, a high pressure sterilization process was developed, and various results of the experiments of the high pressure sterilization process wherein the natural juice is compressed with high pressure in excess of 1,000 atm. are published in e.g. "Nippon Nogeikagaku Kaishi (The Journal of the Japanese Association of Agricultural Chemistry)" Vol 63, No. 6 (1989) According to these articles, the microorganisms including molds and yeasts which can propagate and can be a cause of putrefaction, are entirely killed by being compressed with high pressure of 2,000 atm. for 10 minutes, provided the high pressure process is conducted for the acidic natural juice of citrus fruits of which the pH value does not exceed 4.5.

The technology is publicly known wherein enzymes are added to foodstuffs. For example, some of the aforementioned pectin decomposing enzymes have been employed for dissolving the fruit juice into fine fibrous elements of the fruits and limpid juice. Amylase and cellulase have been employed to decrease the molecular weight of the polysaccharides (for saccharification or decomposition of the polysaccharide to convert them into sugar). Proteolytic enzymes have been employed to prevent the alcoholic liquors from clouding, to soften meat, or to solidify cheese. Proteolytic enzymes have seldom been employed to dissolve or deactivate an enzyme which is a type of protein.

SUMMARY OF THE INVENTION

A high pressure sterilization method was recently developed to enable the natural juice to be stored for a long time. This high pressure sterilization method is free from the aforementioned drawbacks in which the quality of natural juice is deteriorated and which are inevitable for a heating sterilization method, such drawbacks including destruction of the nutritious elements, dispersion of aromatic elements and deterioration of the color and the taste of the sterilized juice. The published results of experiments regarding the high pressure sterilization method indicate that the microorganisms including molds and yeasts which can propagate and can be causes of putrefaction, are entirely killed by being compressed with high pressure of 2,000 atm. for 10 minutes, provided the high pressure process is conducted for the acidic natural juice of citrus fruits of which the pH value does not exceed 4.5. Although the bacteria, the spores and the like can not be killed by the high pressure sterilization process conducted with high pressure of 2,000 atm. for approximately 10 minutes, since the bacteria, the spores and the like can not propagate in the acidic juice of which the pH value does not exceed 4.5, the natural juice treated with a high pressure sterilization process does not allow putrefaction to occur therein and is allowed to be stored for a long time.

The pectin decomposing enzymes contained in the natural juice, however, are not deactivated by a high pressure sterilization process, even if the pressure is as high as 6,000 atm. and the sterilization period is as long as 30 minutes. Thus, pectin decomposing enzyme contained in the natural juice remains active even after the juice was treated with a high pressure sterilization process and dissolves the colloidal juice into precipitation of the fibrous elements of fruits and limpid juice, resultantly remaining the drawbacks unremoved by the high pressure sterilization process.

Accordingly, the object of this invention is to provide a method for treating fruit juice with high pressure, which method is effective to kill the microorganisms e.g. molds, yeasts and the like and also to dissolve the pectin decomposing enzymes, resultantly maintaining the natural juice which has been treated with the method as a colloidal suspension in which fibrous elements are combined with one another due to the function of pectin and preventing the natural juice from being dissolved into precipitation and limpid juice.

To achieve the aforementioned object, a method for treating fruit juice with high pressure in accordance with this invention has a step for adding proteolytic enzyme particularly that which is active in an acidic environment, into natural fruit juice containing pectin and at least a pectin decomposing enzyme, and a step for compressing the natural fruit juice with high pressure in excess of 2,000 atm., thereby killing the microorganisms e.g. molds, yeasts and the like and also decomposing and deactivating the pectin decomposing enzyme which is a prorein, resultantly remaining the colloidal juice undissolved into fibrous elements of a fruit and limpid juice and preventing the as-extracted juice from being dissolved into fibrous elements of a fruit and limpid juice.

The method for treating fruit juice with high pressure of this invention is allowed to be applied for sterilizing any juice of citrus fruits, apples, peaches or the like of which the pH value is 2.0 through 5.0, since any of the natural juice of these fruits contains pectin and at least one pectin decomposing enzymes. In other words, a colloidal suspension, a combination of fibrous elements of the aforementioned fruits and pectin, is allowed to be treated by the method for treating fruit juice with high pressure of this invention, regardless the natural juice is as-extracted 100% juice, condensed juice, diluted juice, or juice commingled with sugar or some organic acids.

Since the pH value of most natural juice ranges from 2.0 through 5.0, one or more proteolytic enzymes (each of which is called an acidic protease) which are active in an acid, e.g. cathepsin D, rennin and the like is or are added to pectin decomposing enzymes for the purpose to deactivate the pectin decomposing enzymes which are proteins, e.g. pectin esterase and polygalacturonase.

The quantity of the aforementioned proteolytic enzyme to be added is required to be the quantity sufficient to decompose the aforementioned pectin-decomposing enzyme with a high pressure sterilization process with 2,000 atm. It is needless to refer to that the quantity of the aforementioned proteolytic enzyme to be added can be selected commensurate to the power or capacity to deactivate the proteolytic enzyme employed and to the concentration of the pectin decomposing enzymes contained in the natural juice to be sterilizated.

The proteolytic enzyme which is active in an acid is allowed to be added to the natural juice any time before the natural juice is treated with high pressure in excess of 2,000 atm., provided the natural juice is a colloidal suspension. In other words, the proteolytic enzyme is allowed to be added to the natural juice immediately after being extracted, after being condensed, after being diluted or after being added with sugar or an organic acid. The quantity of the proteolytic enzyme to be added is required to be sufficient to deactivate the entire quantity of the pectin decomposing enzymes. The proteolytic enzyme which is active in an acid can be added even after the natural juice was applied with a high pressure sterilization process which is conducted with high pressure in excess of 2,000 atm., and this is more advantageous from the viewpoints of the activity of the proteolytic enzymes. However, since it is difficult to acquire a proteolytic enzyme which does not contain microorganisms e.g. molds and/or yeasts (In the case of a heating sterilization process, a proteolytic enzyme is also deactivated.), and also since it is difficult to add a proteolytic enzyme to the natural juice, after the juice is packed in a sealed package, a proteolytic enzyme is required to be added to the natural juice, before a high pressure sterilization process is applied.

FIG. 1 illustrates an example of a compression vessel in which a high pressure sterilization process can be conducted. The compression vessel contains a pressure resisting container (11) surrounded by a water jacket (17) which is supplied water through a water tube (14), a pressure resisting top closure (16), and a piston (12) which is operated by hydraulic pressure which occurrs in a hydraulic cylinder (13) to which a compressed oil is supplied from a high pressure oil pump (not shown) through a compressed oil supply tube (15). When a high pressure sterilization process is conducted, employing the aforementioned compression vessel, the natural juice is sealed in a high pressure chamber (2). If preferable, the natural juice is packed in one or more packages, and the one or more packages, together with water which acts as a pressure transmission medium, is or are sealed in a high pressure chamber (2). Then, high pressure of 2,000 through 10,000 atm. is applied to the aforementioned natural juice by employing the aforementioned hydraulic system.

The applied pressure and the pressure application period are determined, following the nature of the microorganism to be killed, and the applied pressure is usually selected between 2,000 through 7,000 atm. and the pressure application period is usually selected between 5 through 120 minutes. The applied pressure and the pressure application period can be decreased, if the natural juice or the pressure medium water is heated within the extent in which the heating does not deteriorate the quality of the processed natural juice, and if the temperature of the juice is controlled by employing the water jacket (17), during the period in which the high pressure sterilization process is applied to the natural juice. However, since a high pressure sterilization process to be conducted with 2,000 through 5,000 atm. for 5 through 30 minutes is sufficient to kill the microorganisms e.g. the molds, the yeasts which can propagate in an acid whose pH value is 2.0 through 5.0, and since a high pressure sterilization process to be conducted with high temperature in excess of 2,000 atm. is inclined to deteriorate the activity of the proteolytic enzyme which is active in an acid, a high pressure sterilization process to be conducted under the normal temperature is more preferable.

During the period in which a high pressure sterilization process is conducted, the natural juice to be sterilized is allowed to be sealed in a package which is soft and easy to transmit temperature. The natural juice to be sterilized is allowed to be packed in a package, for example, a pouch made of a soft plastic film, a box made of hard paper, a cup made of a hard plastic or paper film, before it is sealed, without remaining air therein. Since no air remaining in the package, the package wall receives the uniform pressure on the whole sides thereof. Therefore, the package wall made of a soft material is not broken even under extreme high pressure in excess of 2,000 atm.

BRIEF DESCRIPTION OF THE DRAWINGS

A more detailed description will be presented below to more clearly explain the feature of the method for treating fruit juice with high pressure, referring the drawing itemized below.

DETAILED DESCRIPTION OF PREFERRED EMBODIMENTS

Figure 1:
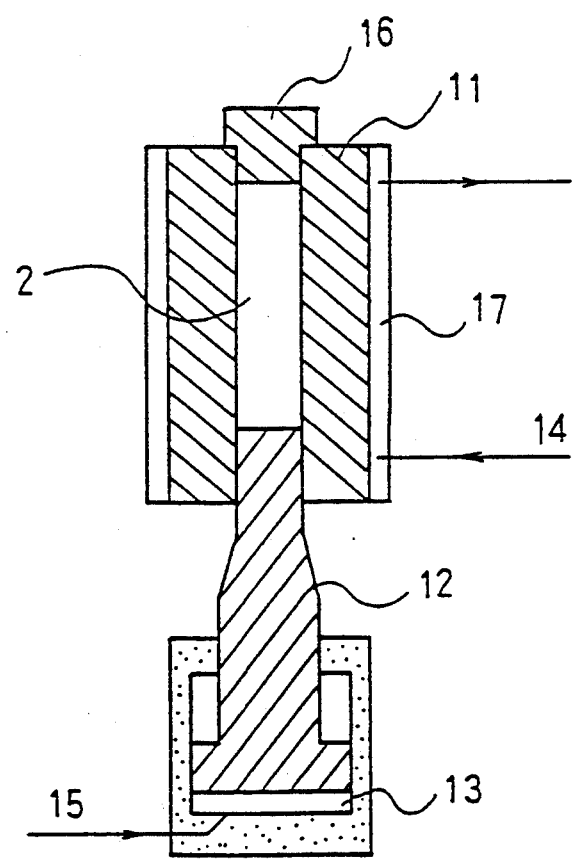
FIG. 1 is a schematic drawing of a compression vessel employable for a high pressure sterilization process to be conducted with pressure in excess of 2,000 atm., in accordance with this invention.

As-extracted 100% orange juice which contained pectin and at least a pectin decomposing enzyme and of which the pH value was 3.8, was added with respectively 1 mg/ml, 5 mg/ml and 10 mg/ml of pepsin (a proteolytic enzyme active in an acid having the optimum pH value of 2 and the activity of 10 FIP-U/mg) and prepared three independent specimens. Each of these three independent specimens was split into three independent plastic pouches having the volume of 10 milli liters, and the pouches were sealed, paying attention to evauate all air in the pouches. In this manner nine specimens were prepared. These nine specimens were added with $10^3$/ml of baker's yeast to make sure the results of this experiment were accurate. Each specimen was left alone. at room temperature for 1 hour, before a high pressure sterilization process was conducted at 20 degrees C with 4,000 atm. for 10 minutes. After the high pressure sterilization process was finished, each specimen was left alone for three days.

For the purpose of comparison, the as-extracted 100% orange juice was added with 10 mg/ml each of papain (a proteolytic enzyme active under neutral situation having the optimum pH value of 7 through 8 and the activity of 3,000 VSP-U/mg) or of α-chymotrypsin (a proteolytic enzyme active under neutral situation having the optimum pH value of 7 through 8 and the activity of 1,530 U/rag) and with $10^3$/ml of baker's yeast to prepare two specimen for comparison. Further, the as-extracted 100% orange juice was added with $10^3$/ml of baker's yeast alone to prepare the third comparison specimen. Each of these three comparison specimens was split into three plastic pouches each of which has the volume of 10 milli liters. After being left alone at room temperature for 1 hour, a high pressure sterilization process was conducted at 20 degrees C with 4,000 atm. for 10 minutes, employing the compression cylinder illustrated in FIG. 1. After the high pressure sterilization process was finished, each specimen was left alone for three days.

Visual tests and tasting tests were applied to 9 specimens of the embodiments (3 pouches of 3 independent embodiments) and to 9 comparison specimens (3 pouches of 3 independent comparison specimens).

As a result, the specimens to which 10 mg/ml of proteolytic enzyme active in an acid was added, were entirely maintained undeteriorated and all of them remained as colloidal suspensions having good flavor and taste.

On the other hand, however, two of three specimens to which 5 mg/ml of proteolytic enzyme active in an acid was added, were entirely maintained undeteriorated and all of them remained as colloidal suspensions having good flavor and taste. However, one of them was slightly dissolved into precipitation and limpid juice. This indicates the quantity of proteolytic enzyme added to the natural juice was assumedly critical.

Thirdly, all of the species to which 1 mg/ml of proteolytic enzyme active in an acid was added, were slightly dissolved into precipitation and limpid juice. This indicates the quantity of proteolytic enzyme added to the natural juice was insufficient.

The results of visual tests applied to the nine comparison specimens indicate that all of them were dissolved into fibrous precipitation and limpid juice. This indicates that a proteolytic enzyme active under the neutral situation does not decompose the pectin decomposing enzymes in an acid of which the pH value is 3.8, and pectin decomposing enzymes remain active, even after a high pressure sterilization process was conducted. Particularly, the results of visual tests applied to the comparison specimens to which no proteolytic enzyme was added, indicates that a high pressure sterilization process conducted at 20 degrees C with 4,000 atm. for 10 minutes is ineffective to decompose the pectin decomposing enzymes to cause it to be deactive.

The results for three specimens of embodiments and three specimens of comparison specimens indicate that the baker's yeast did not cause putrefaction at all. The results of the tasting tests indicate that the color, the taste and the fragrance of the as-extracted 100% orange juice is maintained. This indicates the results of a high pressure sterilization process are satisfactory. Regarding the one-hour period in which the specimens were left alone after being sealed and the three-day period in which the specimens were left alone after the high pressure sterilization process was conducted, the inventors of this invention are aware that those periods cause little influence towards the results of the aforementioned visual tests and tasting tests.

The foregoing description has clarified that the high pressure sterilization process in accordance with this invention is effective to kill the microorganisms e.g. molds, yeasts and the like which cause putrefaction and also to dissolve and to deactivate the pectin decomposing enzymes, resultantly maintaining the natural juice as a colloidal suspension in which fibrous elements are combined with one another due to the function of pectin and preventing the natural juice from dissolving into precipitation and limpid juice.

The high pressure sterilization method in accordance with this invention is a sterilization process applicable to the natural juice which is required to be stored for a long time, the sterilization process being free from the drawbacks which are inevitable for the heating sterilization process available in the prior art, including destruction of nutritious elements, dispersion of flavor and/or deterioration of color and/or taste or the like. As the results, the method for treating fruit juice with high pressure in accordance with this invention is allowed to be employed to treat the natural juice for the purpose to store it for a long time in the as-extracted situation in which fine fibrous elements are suspended as a colloid combined with one another due to the function of pectin.

Although this invention has been described with reference to specific embodiments, this does not mean to be construed in a limiting sense. Various other embodiments and/or modifications of this invention will become apparent to persons skilled in the art upon reference to the description of this invention. It is therefore contemplated that claims will cover any such embodiments and/or modifications as fall within the true scope of this invention.

What is claimed is:

1. A method for treating fruit juice with high pressure comprising the steps of:
   keeping natural fruit juice in a colloidal suspension by adding a proteolytic enzyme into said natural fruit juice containing pectin and at least a pectinolytic enzyme so that the proteolytic enzyme decomposes the pectinolytic enzyme, the proteolytic enzyme being selected from a group consisting of pepsin, cathepsin D and rennin, the colloidal suspension being a result of an interaction between pectin and fiber components; and compressing said natural fruit juice with high pressure in excess of 2,000 atm after the proteolytic enzyme has been added to the natural fruit juice.

2. A method for treating fruit juice with high pressure in accordance with claim 1, wherein said proteolytic enzyme is active in an acidic environment having a pH value of about 5.0 or less.

3. A method for treating fruit juice with high pressure in accordance with claim 1, wherein the natural fruit juice is compressed for 5 to 120 minutes.

4. A method for treating fruit juice with high pressure comprising the steps of:

keeping natural fruit juice in a colloidal suspension by adding a proteolytic enzyme into said natural fruit juice containing pectin and at least a pectinolytic enzyme so that the proteolytic enzyme decomposes the pectinolytic enzyme, the colloidal suspension being a result of an interaction between pectin and fiber components; and compressing said natural fruit juice with high pressure in excess of 2,000 atm after the proteolytic enzyme has been added to the natural fruit juice.

* * * * *

UNITED STATES PATENT AND TRADEMARK OFFICE
CERTIFICATE OF CORRECTION

PATENT NO. : 5,328,703
DATED : July 12, 1994
INVENTOR(S) : Yoshihiro NAKAGAWA et al.

It is certified that error appears in the above-indentified patent and that said Letters Patent is hereby corrected as shown below:

Column 2, line 1, "Vol" should be --Vol.--; and line 2, after "(1989)" insert --.--.

Column 3, lines 39 and 40, "pectin-decomposing" should be

--pectin decomposing--.

Column 4, line 8, "supplied" should be --supplies--.

Column 5, line 16, after "manner" insert --,--;

line 20, delete "."; and line 32, "U/rag" should be --U/mg--.

Signed and Sealed this

Twenty-ninth Day of November, 1994

Attest:

BRUCE LEHMAN

*Attesting Officer*     *Commissioner of Patents and Trademarks*